United States Patent [19]

Yagi

[11] 4,087,038

[45] May 2, 1978

[54] FRICTIONAL WELDING METHOD

[75] Inventor: Yutaka Yagi, Aioi, Japan

[73] Assignee: Harima Sargyo Kabushiki Kaisha, Japan

[21] Appl. No.: 747,702

[22] Filed: Dec. 6, 1976

[30] Foreign Application Priority Data

Dec. 19, 1975 Japan .................................. 50-152407
Apr. 7, 1976 Japan .................................. 51-39494

[51] Int. Cl.² ............................................. B23K 21/00
[52] U.S. Cl. .................................................. 228/112
[58] Field of Search .................... 228/112, 113, 114, 2; 156/73

[56] References Cited

U.S. PATENT DOCUMENTS

| 3,144,710 | 8/1964 | Hollander | 228/112 |
| 3,444,611 | 5/1969 | Bogart | 228/112 |
| 3,631,585 | 1/1972 | Stamm | 228/112 |
| 3,726,135 | 4/1973 | Vuceta | 228/112 X |

FOREIGN PATENT DOCUMENTS

| 476,480 | 5/1929 | Germany | 228/112 |
| 709,979 | 6/1966 | Italy | 228/112 |

OTHER PUBLICATIONS

Welding Handbook, Section 3A, American Welding Society 1970, pp. 50.3–50.19.

Primary Examiner—Donald G. Kelly
Attorney, Agent, or Firm—Eugene E. Geoffrey, Jr.

[57] ABSTRACT

The method of effecting a frictional weld between a rod-like member and a flange member wherein the flange member is formed with a hole having a smaller diameter than the rod to be welded thereto, rotating one member relative to the other to heat both members while urging the members into engagement.

3 Claims, 38 Drawing Figures

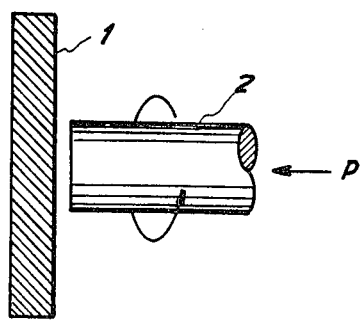
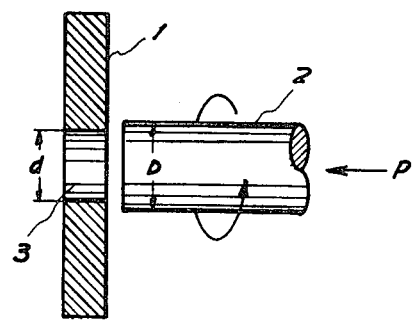
FIG. 1
(PRIOR ART)
FIG. 2
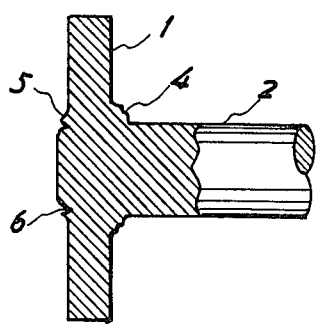
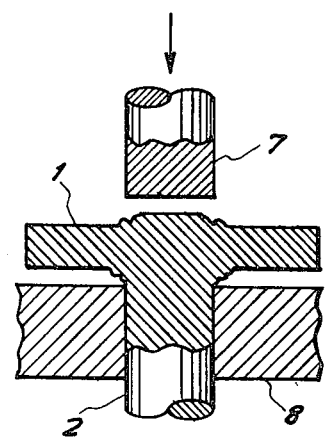
FIG. 3
FIG. 4
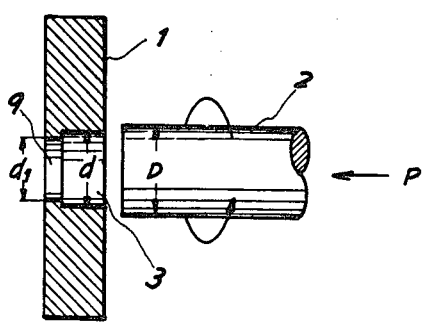
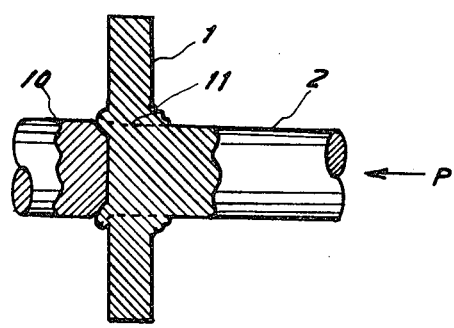
FIG. 5
FIG. 6

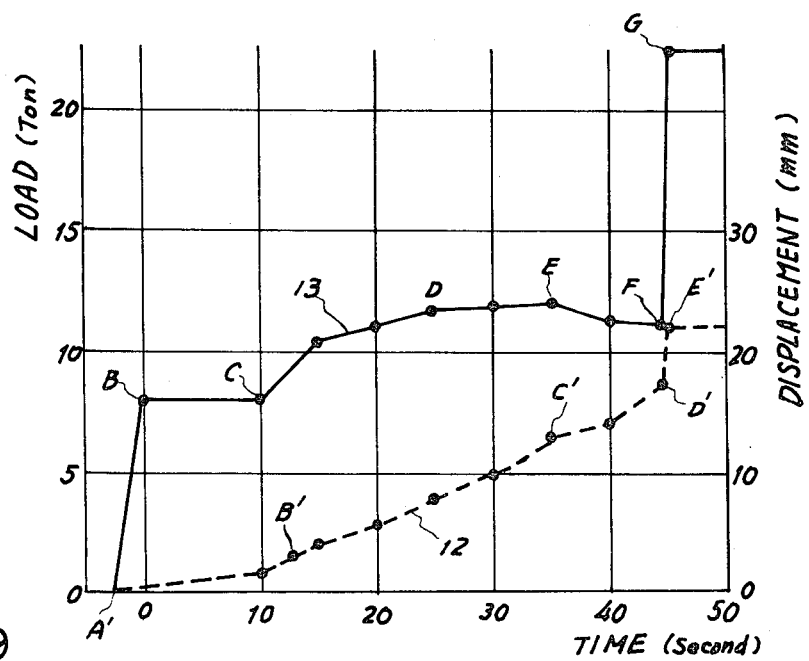
FIG. 9
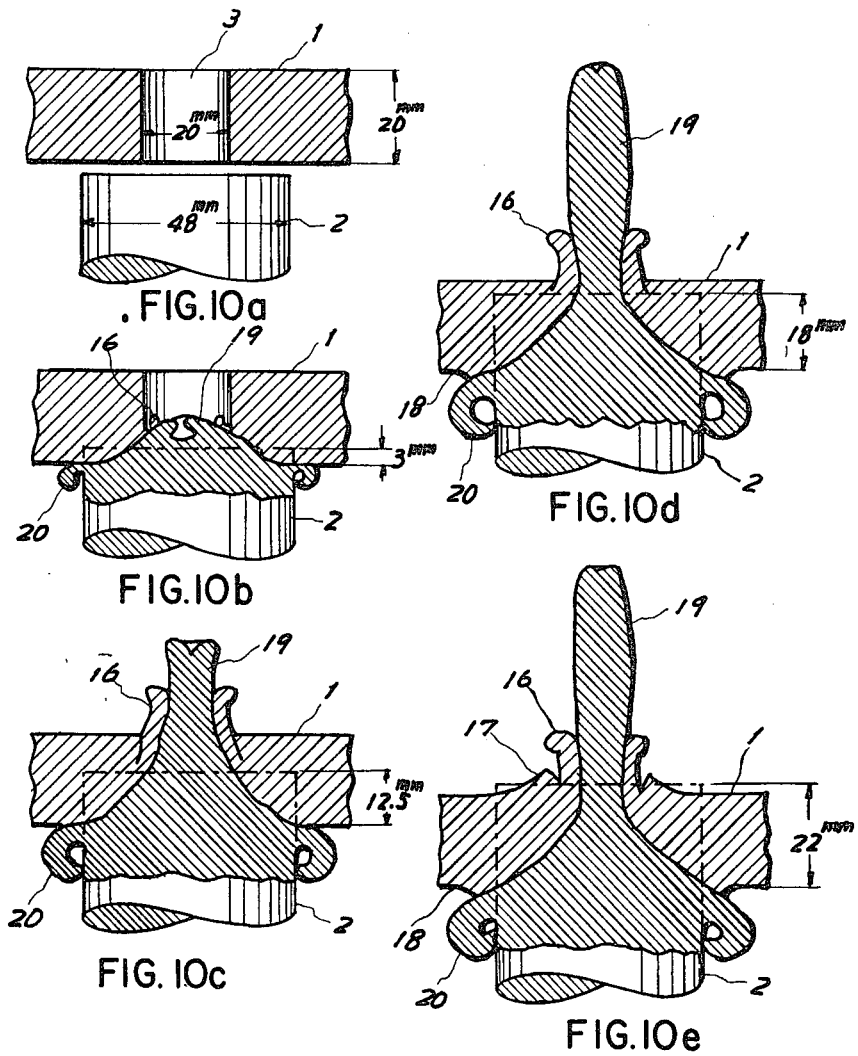
FIG. 10a
FIG. 10b
FIG. 10c
FIG. 10d
FIG. 10e

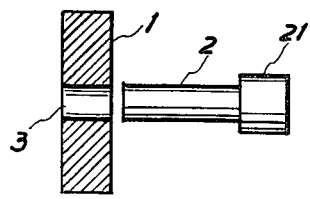
FIG.14a
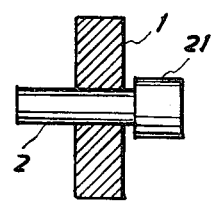
FIG.14b
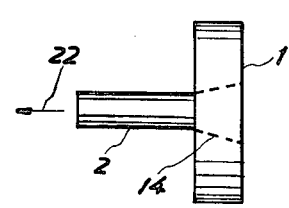
FIG.14c
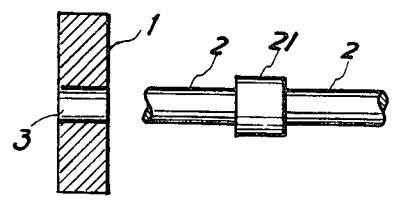
FIG.15a
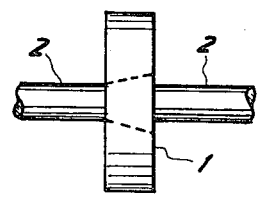
FIG.15b
FIG. 16
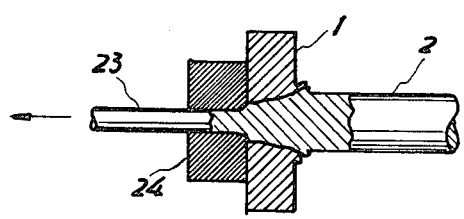
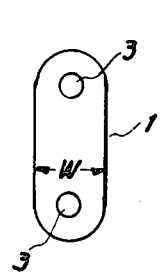
FIG.17a
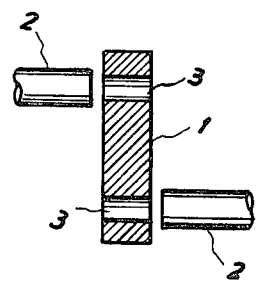
FIG.17b
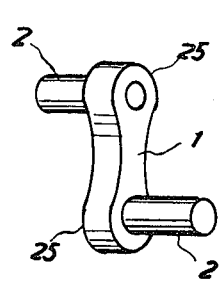
FIG.17c

FRICTIONAL WELDING METHOD

This invention relates to an improvement in frictional welding, which is particularly useful for fixing a flange or wheel-like member coaxially to a round rod or cylinder at an end or midway thereof as for instance the attachment of a footing flange to a post or a stud-like member to a flat or curved plate.

Since olden times, shrinkage fitting, and electric, gas and forge welding have been used generally for securing flanges and the like to rods and cylinders. However, a strong bond has not been obtainable by shrinkage fitting when the thickness of the flange or like member was relatively small, and welding has not only been difficult and time consuming, and therefore, unsuitable for mass production purposes but also introduced foreign substances sometimes into the welded junction which weakened the bond.

Recently, frictional welding techniques have been developed as a substitution for shrinkage fitting and welding. In the frictional welding process, the flange is fixed and the round rod is rotated at high speed such as 1500 rpm (revolutions per minute), or vice versa, and both members are press-contacted to produce frictional heat. When the contacting portions are heated to a red-hot condition, the rotation is stopped and the contact pressure is raised to obtain a welded joint. Although this method is superior in working efficiency and does not introduce foreign substances into the junction, it has the disadvantage that very high bonding pressure such as 600 kg/cm$^2$ is required and, moreover, the resultant bond is relatively weak against shock.

Accordingly, an object of this invention is to provide an improved frictional welding method which, while similar in certain respects to the prior one in working efficiency and other advantages, exhibits much higher bonding strength against shock and other forces and requires a much lower bonding pressure than the prior one.

According to this invention, a circular hole having a diameter which is substantially less than the diameter of the round rod is formed in the flange coaxially with the round rod and the rod is pressed against this circular hole with rotation.

Other objects and features of this invention will be described in more detail hereinunder with reference to the accompanying drawings.

In the drawings:

FIG. 1 is a view in partial section representing a typical prior frictional welding process;

FIG. 2 is a view in partial section illustrating a typical embodiment of the frictional welding process according to this invention;

FIG. 3 is a view in partial section illustrating a junction obtained by the process of FIG. 2;

FIG. 4 is a view in partial section illustrating a test condition for testing the junction of FIG. 3; FIG. 5 is a view in partial section illustrating a variation of the process of this invention;

FIG. 6 is a view in partial section illustrating another variation of the process of this invention;

Figure 7:
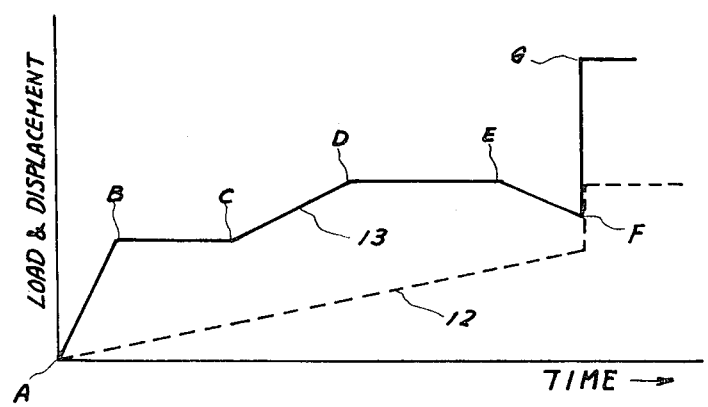
FIG. 7 is a graphic representation of schematic variations of load displacement with respect to time during the process of this invention.

FIGS. 8a–g show a set of partial sectional views illustrating schematically the steps in the formation of the joint during the process of this invention;

FIG. 9 is a graphic representation of actual variations of load and displacement with respect to time of one embodiment of the process of this invention;

FIGS. 10g–e show a set of partial sectional views illustrating actual steps in the formation of the joint in the embodiment of FIG. 9;

FIGS. 11a–e show a set of partial sectional views similar to FIG. 10, illustrating the actual steps in the formation of the junction in another embodiment of this invention; and FIGS. 12a through 17c are diagrams illustrating some modifications of the process of this invention;

Throughout the drawings, like reference numerals are used to denote like or corresponding components.

Referring to FIG. 1 representing a typical prior frictional welding process in the case of fixing a flange 1 to an end of a round rod 2, the flange 1 is fixed and the rod 2 is rotated about its axis at about 1500 rpm. with respect to the flange 1. Then, the rod 2 is pressed against the flange 1 with a pressure P of 300 to 400 kg/cm$^2$ to produce frictional heat. When the contact portions of the components 1 and 2 are heated up to red-hot condition, the rotation is stopped and the pressure P is raised to about 600 kg/cm$^2$ to obtain a welded joint. It is of course possible to obtain the same result by fixing the rod 2 and rotating and moving the flange 1, instead.

On the other hand, according to this invention, as shown in FIG. 2, a circular hole 3 is formed in the flange 1 coaxially with the round rod 2 and, in this case, the diameter d of the hole 3 is made smaller than the diameter D of the rod 2. The difference between both diameters is much greater than that adopted for a shrinkage fit, and is more than one percent of the rod diameter D, while it is less than 0.1 percent in the case of shrinkage fit. As in the case of the prior art method, the rod 2 is rotated and pressed against the flange 1 with a pressure P to produce a frictional heat. In the case of this invention, however, the frictional end of the rod 2 and the hole 3 are plastically deformed by the heat and the rod goes into the hole 3 and then protrudes from the other side of the flange 1 to form a junction as shown in section in FIG. 3.

The pressure P required for the inventive process is much lower than that of the prior art process and, for example,. it was about 120 kg/cm$^2$ when the thickness of the flange 1 was 20 millimeters, the diameters D and d were 48 and 46 millimeters, respectively, and the speed of rotation was 1500 rpm. Although the pressure P increases with an increase in the difference between the diameters D and d, the process of this invention is applicable over a wide range of this difference. Experiments showed that the advantages of this invention could be maintained with a diameter d which was 20 to 99 percent of the diameter D.

As shown in FIG. 3, the junction obtained in accordance with this invention has an annular burr 4 at the entrance of the hole 3 as in the case of prior art process and, in addition, it has an annular burr 5 accompanied by an annular notch 6 at the exit of the hole 3. A microscopic observation has shown that the textures of the flange 1 and the rod 2 were harmoniously blended at the boundary of both components and a punching test, as shown in FIG. 4, using a punch 7 and a die 8 indicated that the shearing strength of the joint was substantially same as that of the material of both components. These conditions are those observable in a forge welded joint.

Although the burrs 4 and 5 and the notch 6 can be removed by machining as occasion demands, if necessary, the notch 6 can be removed by adopting a modified process as shown in FIG. 5. In this process, the diameter $d$ of the hole 3 is lessened to $d_1$ at the exit portion 9. The difference between the diameters $d$ and $d_1$ may be preferably 0.5 to 5 millimeters and, for example, a good result was obtained when the diameter D, $d$ and $d_1$ were 48, 46, and 44 millimeters, respectively.

The notch 6 can be removed also by using an auxiliary tool as shown in FIG. 6. The tool is a push rod 10 disposed facing to the exit of the hole 3 of the flange 1. In this case, the end of the rod 2, which is in red-hot condition, passes through the hole 3 and collides with the push rod 10. It is thereby extended outwardly as shown by dashed lines 11 to cancel the notch 6. This outward extension serves also as a lock to increase the strength against the pulling-out force.

If the pressure P is applied continuously in the process of this invention, the heated and softened rod 2 is endlessly pushed into the hole 3. Accordingly, it is an important problem to determine the optimum point at which the pressure P is to be removed. This problem can be solved in accordance with the second feature of this invention which will be described hereinunder with reference to FIGS. 7 and 8.

Figure 8A:
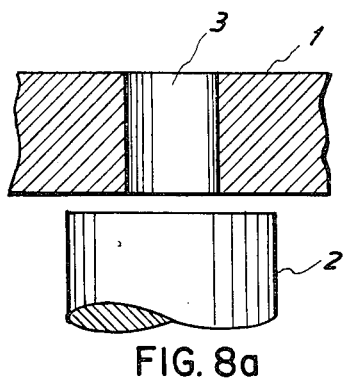
Figure 8D:
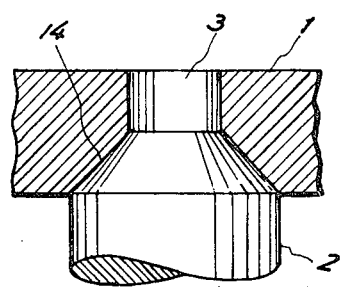
Figure 8B:
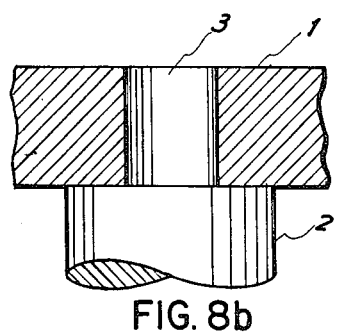
Figure 8E:
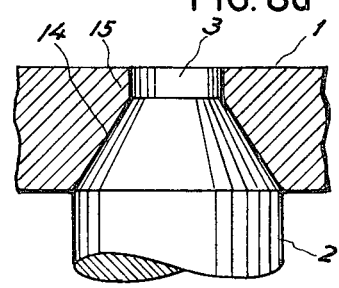
Figure 8C:
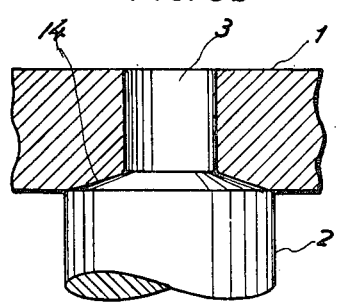
Figure 8F:
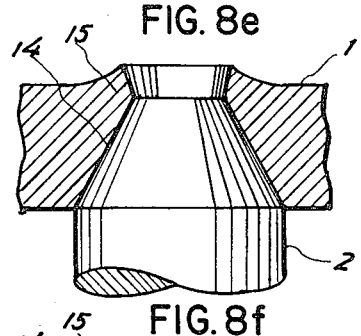
Figure 8G:
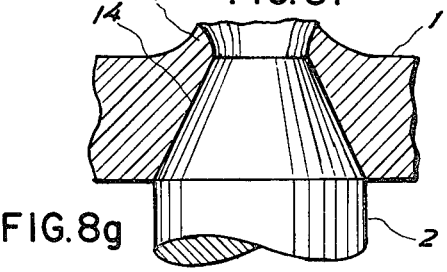
Figure 11A:
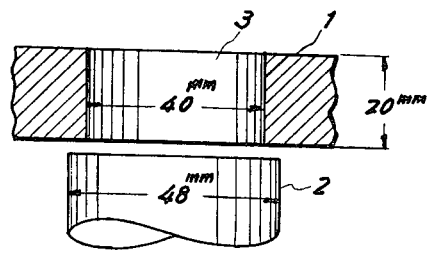
Figure 11D:
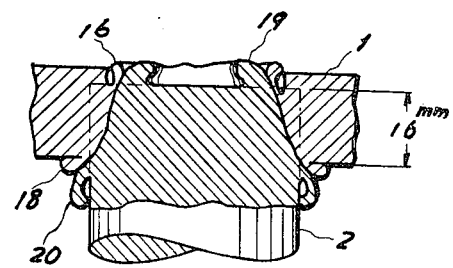
Figure 11B:
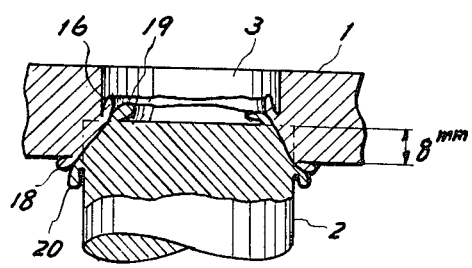
Figure 11E:
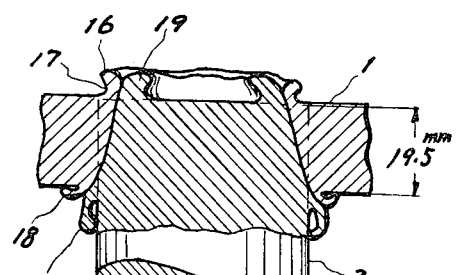
Figure 11C:
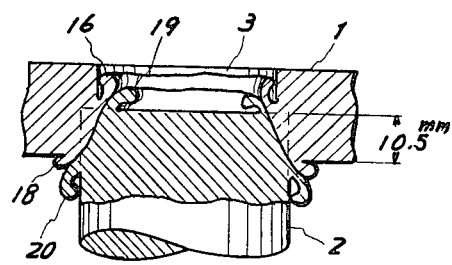
Figure 12A:
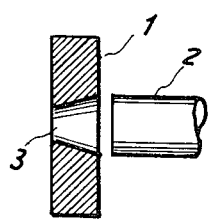
Figure 12B:
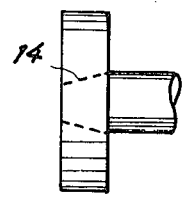
Figure 13A:
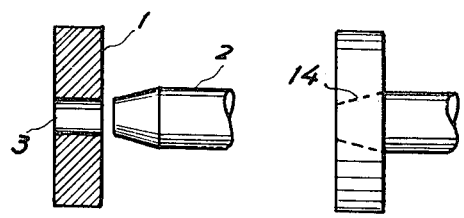
Figure 13B:
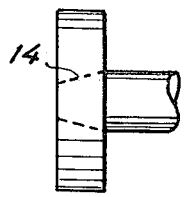

When the rod 2 is pushed by the plunger of a hydraulic press (not shown) at a uniform speed as shown by a dashed line 12 in FIG. 7, the hydraulic pressure, which is a load applied to the rod 2, tends to vary along a curve 12 from A to F. FIGS. 8(a), 8(b), . . . 8(g) show the positional relationship and deformation of the flange 1 and the rod 2 at the points A, B, . . . G in FIG. 7.

In the range from A to B, the load is suppressed by a safety device on the hydraulic press and increases rather slowly the flange 1 and the rod 2 are separated from each other. After the components 1 and 2 come in contact at B, the load is kept substantially constant to point C at which the contact portions of both components 1 and 2 approach their melting points and the rod 2 cuts a little into the flange 1 to form a boundary surface 14. After C, the load increases gradually to D and, during this interval, the boundary surface 14 grows into a cone. Thereafter, the load is again fixed with a slight fluctuation from D to E and, in this interval, the rod 2 advances in the hole 3 and deepens the conical boundary surface 14. At point E, the forward end of the rod 2 reaches a position a little behind the exit of the hole 3 but the peripheral portion 15 of the exit is not yet deformed. However, after point E, the peripheral portion 15 reaches its forgeable temperature and is deformed easily to reduce resistance to the advance of the rod 2. Consequently, the load tends to decrease after point E.

This load reduction after point E is a peculiar feature of the process of this invention and has never been observed in the prior art process. As abovementioned, this effect teaches that the components 1 and 2 reach their forgeable temperature at least at the whole boundary surface and it is the optimum point for effecting the final step in the bonding process. According to this invention, therefore, just after the reduction of load is observed, for example, at point F, the rotation is stopped and, at the same time, the rod 2 is further advanced a predetermined distance by raising the hydraulic pressure to point G. This procedure will be referred hereinunder as "up-set". In order to know the optimum upset point F, it is required to obtain the clear knee point E. If the thickness of the flange 1, the diameter of the rod 2 and the materials of the components have been determined, it is attained by adequately selecting the diameter of the hole 3, hydraulic pressure and advancing speed of the hydraulic press.

In practice, the knee points D and E are generally unclear, while the knee points B and C are relatively clear. Moreover, the conical boundary surface 14 is also vague and deformed substantially from an ideal cone. FIG. 9 shows load and displacement curves practically obtained in one embodiment.

In the embodiment of FIG. 9, a flange 1 was used having a thickness of 20 millimeters and a hole 3 of 20 millimeters in diameter and a round rod having a diameter of 48 millimeters, as shown in FIG. 10(a), both being made of steel. As shown in FIG. 9, the knee points B and C are relatively clear but the knee points D and E are not clear. FIGS. 10(a), 10(b), . . . 10(e) show respectively the statuses of the longitudinal section of the joint at points A', B', . . . E' in FIG. 9. Although, in FIG. 10, the boundary between the flange 1 and the rod 2 is indicated with a clear line, it should be noted that this is only for explanation purposes and the boundary is not observable so clearly in practice. In the drawings, phantom lines give the probable positions of the top of the rod 2 if not to be deformed. As shown in the drawings, various burrs are formed during the process. The burr 16 is formed of a molten portion of the flange 1 which is pushed out to the front of the rod 2, the burrs 17 and 18 are formed of a softened portion of the flange 1 which is deformed with insertion of the rod 2 and the burrs 19 and 20 are formed of a molten portion of the rod 2 which is pushed out to the front and back, respectively.

Referring to FIG. 11, there are shown sectional views similar and corresponding to FIG. 10, in which only difference is that the diameter of the hole 3 is 40 millimeters. In this case, also, the load varied almost similarly to the curve 13 of FIG. 9. Phantom lines also show the probable positions of the top of the rod 2.

Based upon the abovementioned principle of this invention, various modifications can be made without departing from the scope of the invention. Undesirable burrs formed during the process can be minimized by suitably shaping the end of the rod 2 or the hole 3. For example, the hole 3 is conically shaped in FIGS. 12a–b and the end of the rod 2 is conically shaped in FIGS. 13a –b. Conical boundaries 14 are obtained in both cases.

In FIGS. 14a–c the diameters of the rod 2 and the hole 3 are selected such that the rod 2 can be loosely inserted in the hole 3, and an enlarged portion 21 is formed at the other end of the rod 2, as shown in FIG. 14(a). In this embodiment, the rod 2 is first inserted in the hole 3 as shown in FIG. 14(b) and then the method of this invention is applied to the enlarged portion 21. The resultant joint having a generally conical boundary 14 is especially strong against tension in the direction 22 as shown in FIG. 14(c).

In FIG. 15(a), an enlarged portion 21 is formed midway of the rod 2. When the same process as described in connection with FIGS. 14a–c is applied to the enlarged portion 21, the flange 1 is fixed midway of the rod 2 as shown in FIG. 15(b). A similar product can be obtained, as shown in FIG. 16, by applying the process of this invention to the flange 1 and the round rod 2 and, at the same time, drawing the burr 19 into a rod 23 by using a die 24.

Although, in the abovementioned embodiments, a circular flange 1 was fixed at an end or midway of a round rod 2, it is clear that the flange 1 may be substituted with not only another circular member such as gear or wheel but also a noncircular member. FIGS. 17a–c show a process of making a crank (FIG. 17(c)) by forcibly inserting crank pins 2 in two holes 3 of a crank arm 1 in accordance with the method of this invention (FIG. 17(b)). In this case, the arm 1 is extended at both ends 25 and shaped into a bar-bell configuration as shown in FIG. 17(c) if the width W of the arm 1 is relatively small (FIG. 17(a)) and the diameter of the pins 2 is relatively large.

The process according to this invention has many advantages as listed below.

(1) In addition to high efficiency of working as in the case of the prior frictional welding method, the contact pressure is much lower than the prior one, for example, one third at most.

(2) The joint strength is much higher than those obtained by prior frictional welding and other welding techniques, because the bond is formed between the inner surface of the hole and the outer surface of the rod and a much greater area of the boundary surface is obtained.

(3) No preliminary working or finishing of the members to be bonded is required since scales and foreign substances are automatically extracted along the frictional surface.

(4) The diameters of the rod 2 and the hole 3 are not critical and a slight eccentricity is acceptable since the joint is formed between molten portions of both members.

(5) The time point suitable for the up-set procedure can be easily detected and, therefore, the consequent reduction of failure in working raises the yield of the products.

I claim:

1. A frictional welding method comprising the steps of forming an opening extending through a first member having a lateral dimension greater than its longitudinal dimension, preparing a second member having a lateral area greater than the area of said opening and a longitudinal dimension greater than its lateral dimension, rotating one of said members with respect to the other of said members about the longitudinal axis of said second member and urging said members into pressure engagement to force said second member into the opening in said first member to produce frictional heat therebetween and soften and deform the contacting portions of both members to form a generally conical welded bond between both members, stopping said rotation and increasing the pressure to complete the weld between the members.

2. The method according to claim 1 wherein said second member is a round rod, said opening in the first member is round and the diameter of said opening is selected within a range from 20% to 99% of the diameter of said round rod.

3. The method according to claim 1 wherein said step of stopping rotation and increasing the pressure is executed at a time point after the applied pressure begins to decrease as a result of the developed heat and softening of the members.

* * * * *